(12) United States Patent
Bulusu et al.

(10) Patent No.: US 12,175,090 B2
(45) Date of Patent: Dec. 24, 2024

(54) REUSING OR REPURPOSING MICROELECTRONIC DEVICES, AND ASSOCIATED METHODS, DEVICES, AND SYSTEMS

(71) Applicant: Micron Technology, Inc., Boise, ID (US)

(72) Inventors: Srinivasa Anuradha Bulusu, Boise, ID (US); Akshaya Venkatakrishnan, Boise, ID (US); Alaa Ali, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 143 days.

(21) Appl. No.: 17/661,973

(22) Filed: May 4, 2022

(65) Prior Publication Data

US 2023/0359366 A1 Nov. 9, 2023

(51) Int. Cl.
 *G06F 3/06* (2006.01)
(52) U.S. Cl.
 CPC .......... *G06F 3/0619* (2013.01); *G06F 3/0634* (2013.01); *G06F 3/0659* (2013.01); *G06F 3/0679* (2013.01)

(58) Field of Classification Search
 CPC .... G06F 3/0619; G06F 3/0634; G06F 3/0659; G06F 3/0679; G06F 3/0607; G06F 3/0653; G06F 3/0616
 See application file for complete search history.

(56) References Cited

U.S. PATENT DOCUMENTS

| | | |
|---|---|---|
| 5,538,141 A | 7/1996 | Gross, Jr. et al. |
| 6,194,738 B1 | 2/2001 | Debenham et al. |
| 7,194,667 B2 | 3/2007 | McBride |
| 7,237,158 B2 | 6/2007 | Debenham |
| 2013/0007279 A1* | 1/2013 | Banerjee ............... G06F 9/505 709/226 |

* cited by examiner

*Primary Examiner* — Hiep T Nguyen
(74) *Attorney, Agent, or Firm* — TraskBritt

(57) ABSTRACT

Methods of reusing and/or repurposing microelectronic devices are disclosed. A method may include receiving an indication of a selected secondary application for a microelectronic device and accessing health information for the microelectronic device. The method may further include determining whether the microelectronic device is fit for the selected secondary application responsive to the health information. Associated devices and systems are also disclosed.

24 Claims, 5 Drawing Sheets

REUSING OR REPURPOSING MICROELECTRONIC DEVICES, AND ASSOCIATED METHODS, DEVICES, AND SYSTEMS

TECHNICAL FIELD

Embodiments of the disclosure relate generally to microelectronic devices and, more specifically, to reusing or repurposing microelectronic devices. Yet more specifically, various embodiments relate to reusing or repurposing a microelectronic device for use in a secondary application based on one or more factors associated with the microelectronic device. Related methods, devices, and systems are also disclosed.

BACKGROUND

Memory devices are typically provided as internal, semiconductor-based, integrated circuits in computers or other electronic systems. Several types of memory exists including, for example, random-access memory (RAM), read-only memory (ROM), dynamic random access memory (DRAM), synchronous dynamic random access memory (SDRAM), resistive random access memory (RRAM), double data rate memory (DDR), low power double data rate memory (LPDDR), phase change memory (PCM), and flash memory. Flash memory may include, for example, NAND flash memory or NOR flash memory.

DETAILED DESCRIPTION

Figure 1:
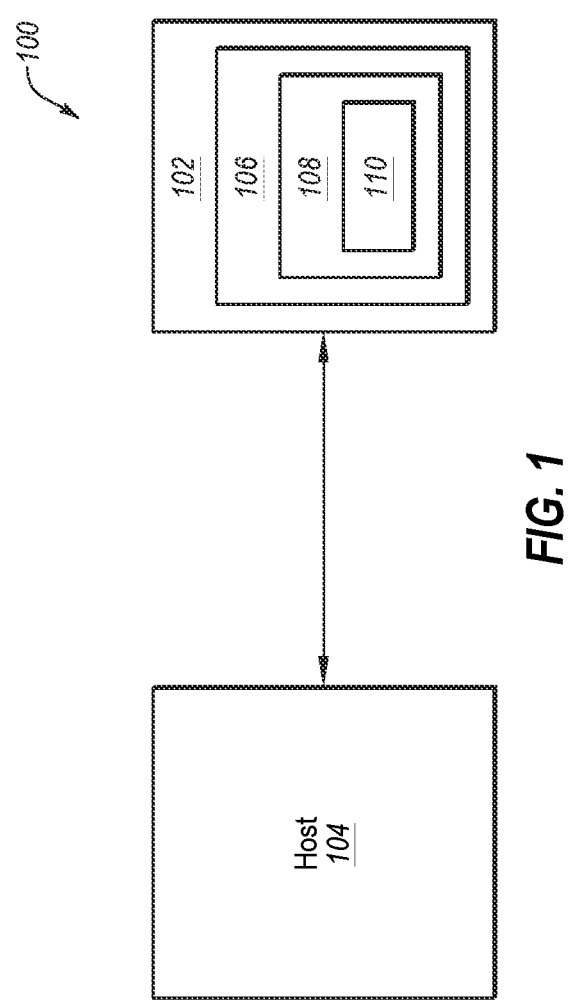
FIG. 1 is a simplified block diagram of an example memory system including a memory device coupled to a host, in accordance with various embodiments of the present disclosure.

As will be appreciated by a person having ordinary skill in the art, memory devices may be used in a number of applications within, for example, smartphones, tablets, computers, toys, cameras, servers, tracking devices, medical devices, motor vehicles (e.g., automobiles), etc. Memory device manufacturers often provide performance and other operational specifications regarding manufactured memory devices. As will be appreciated, specifications of a memory device, which may be provided in a data sheet or spec sheet (also commonly referred to as a "spec" or a "specification"), may be targeted for use in one or more primary applications (e.g., automotive applications, medical applications, industrial applications, commercial applications, without limitation).

A memory device may fail to meet provided specifications due to a fault in manufacturing or due to extended use of the memory device. More specifically, for example, after an extended period of use, a memory device may begin to deteriorate and fail to perform according to the original specifications. Further, some memory devices may include one or more defects that cause errors and/or faults identified via one or more tests (e.g., probe test, burn-in tests, and other tests) performed at various points during or after a manufacturing process. Certain applications, such as automotive or medical device applications, may require that memory devices meet strict specifications and allow for few errors or faults. Other, low risk applications, such as industrial or commercial applications (e.g., use within computers, personal tracking devices, and other simple computation devices) may have less strict specifications and thus less qualified memory devices (e.g., older memory devices and/or memory devices with minor failures) may be used in these applications.

Conventionally, memory devices that are not fully qualified (e.g., per data sheets) and/or older memory devices (e.g., memory devices that have exhausted their lifespan (e.g., via exceeding a number of program/erase cycles)) often end up being thrown away or destroyed, leading to waste of valuable materials and adding to semiconductor waste. In some instances, memory devices with minor probe and/or quality fails may be downgraded and used with modified specifications.

Conventional solutions to recycle memory fail to satisfy the need to reuse or repurpose memory not qualified by a manufacturing company (e.g., at the die level and/or package level). Additionally, conventional solutions to recycle memory are not always sustainable, nor do they always reduce waste for a semiconductor manufacturing company.

Various embodiments described herein relate to reusing and/or repurposing memory devices. More specifically, according to various embodiments, memory devices that do not meet specification requirements for one application (e.g., a higher demand application, such as an automotive application) may be reused in or repurposed for another application (e.g., a lower demand application, such as an industrial or commercial application). As will be appreciated, automotive applications may generally be the most demanding applications followed by industrial applications, followed by commercial applications.

More specifically, according to various embodiments, a memory device, which is not fully qualified (e.g., for use in one application (e.g., a primary application)) (e.g., per a data sheet) and/or has exhausted its life expectancy, may be used in at least one of a number of possible secondary (also referred to herein as "reuse" or "repurpose") applications. Stated another way, a memory device, which, for example, is not fully qualified for a primary application (e.g., an automotive application) and/or has exhausted its life expectancy (e.g., from being used in a primary application), may be configured to operate in a secondary or alternate mode (also referred to herein as a "reuse mode" or a "repurpose mode") while being used in a secondary application (e.g., an industrial or commercial application, such as within a mobile phone, a smartphone, a tablet, an e-reader, Internet of things (IoT) device, a camera, a computer, or a video game console). For example, specifications for a secondary application may be less demanding and may allow for a greater number of failures (e.g., detected during testing and/or performance of the memory device). Further, for example, specifications for a secondary application may allow for use of older memory devices (e.g., memory devices having exhausted their life expectancy via use in a primary application).

As will be understood by a person having ordinary skill in the art, memory devices and/or memory systems may include information related to the health thereof. More specifically, a memory device may include (i.e., store) a health report that includes information such as, for example, results of tests performed on the memory device (e.g., information identifying block statuses (e.g., bad blocks), thermal test results, and/or life expectancy, without limitation). Further a health report may include information regarding use of the memory device (e.g., a number of program and erase operations performed by the memory device). Generally, a health report may be a resource that allows memory device lifetime to be determined and/or usage monitored (e.g., by a customer). As will also be understood by a person having ordinary skill in the art, a health report, and more specifically, information in the health report, may be accessed (e.g., via a host) via one or more (e.g., a series of) commands issued via an interface (e.g., an SCSI interface of a universal flash storage (UFS) device).

Conventional health reports may include information for a given customer, such as an automotive customer or a mobile device customer. Examples of conventional health reports include UFS health reports, Joint Electron Device Engineering Council (JEDEC) health reports, and automotive health reports. Some health reports may include information described in the JEDEC standards. Conventional health reports do not include data related to reusing a memory device in or repurposing the memory device for one or more secondary applications.

According to various embodiments as described more fully below, a health report for a memory device may include additional (e.g., different) information compared to conventional health reports. For example, according to various embodiments, and in contrast conventional reports, a health report may include a reuse state indicative of whether the memory device may be reused and/or repurposed. If the memory device may be reused and/or repurposed, the health report may also include a health grade (e.g., health state of the memory device), one or more possible secondary applications (e.g., based on the health of the memory device), and/or operating conditions for reuse. In some embodiments, a health grade (i.e., as provided in a health report) may be used to determine a number of possible secondary applications. More specifically, if, for example, a memory device has a poor health grade, a number of possible secondary applications that do not require strict data retention may be identified (e.g., in the health report). Moreover, in some embodiments, the health report may include operational data (e.g., temperature data, signal data, reliability data) for the memory device.

According to some embodiments, a health report of a memory device, or at least a portion of the data of the health report, may be extracted from a memory device (e.g., via a host or another device) and health report information may be used to determine a number of possible secondary applications for reuse of the memory device and/or determine whether a selected secondary application is a suitable application for the memory device. According to other embodiments, a memory device may be tested (e.g., at die and/or package level), and in response to determining that the memory device does not meet the requirements for its primary application, the memory device may be repurposed for a secondary application (e.g., based on the types of failures and/or violations detected during testing).

In some embodiments, as described more fully below, a secondary application for a memory device may be selected (e.g., via a user), and health information for the memory device may be evaluated to determine if the memory device is fit for use in the selected secondary application. In other embodiments, a determination may be made as to whether or not a memory device may be reused (i.e., is the memory device configured for reuse in another application), and responsive to determining that the memory device may be reused, health information for the memory device may be evaluated to determine one or more possible secondary applications for the memory device. According to various embodiments, an alternate mode (e.g., a reuse mode) for a memory device (i.e., to be used in a secondary application) may be activated (e.g., either selectively (e.g., by a user or a manufacture) or in response to an event (e.g., at the end of the life of the memory device)).

Although various embodiments are described herein with reference to memory devices, the present disclosure is not so limited, and the embodiments may be generally applicable to microelectronic devices that may or may not include semiconductor devices and/or memory devices. For example, various embodiments may be generally applicable to non-memory devices including, but not limited to, CPUs, GPUs, logic, application-specific integrated circuits (ASICS), etc. Further, although various embodiments are described herein with reference to NAND flash memory, the present disclosure is not so limited, and the embodiments may be generally applicable to any suitable memory including any flash memory and other types of memory (e.g., ROM, DRAM, SDRAM, SRAM, etc.). Moreover, although automotive applications and medical applications are provide herein as example primary applications, and industrial applications, commercial applications, and more specifically, industrial and consumer devices (e.g., smartphones, tablet, e-reader, IoT devices, camera, computers, etc.) are provided herein as example secondary applications, the disclosure is not so limited. Rather, embodiments of the disclosure include reusing or repurposing memory, which was used in or intended to be used in one application, in another application. Embodiments of the disclosure will now be explained with reference to the accompanying drawings.

FIG. 1 is a simplified block diagram of an example memory system 100 including a memory device 102 and a host 104, according to various embodiments of the disclosure. For example only, the memory device 102 may include a flash memory device (e.g., a NAND flash memory device), a DRAM (dynamic random access memory), a SRAM (static random access memory), a SDRAM (synchronous dynamic random access memory), a DDR SDRAM (double data rate DRAM, such as a DDR4 SDRAM and the like), or a SGRAM (synchronous graphics random access memory), or any other suitable memory device. The memory device 102, which may be integrated on a semiconductor chip, may include a number of memory arrays 106, wherein each memory array 106 includes a number of memory cells. For example, memory arrays 106 may include NAND flash memory arrays, DRAM memory arrays, or any other suitable memory arrays. According to various embodiments, at least one memory array 106 may include a health report 108, which may include a number of programmable data fields 110 for storing information related to reusing and/or repurposing the memory device 102.

As noted above, according to various embodiments, the health report 108 may include additional information compared to conventional health reports. For example, according to various embodiments, the health report 108 may include information regarding whether or not the memory device 102 may be reused (i.e., in a secondary application). Further, according to various embodiments, the health report 108 may include a reuse grade, which may indicate a health status or state of the memory device 102 and/or which secondary applications (e.g., non-power-stringent applications, lower demand applications, non-signaling-stringent applications) may or may not be suitable for the memory device 102. Moreover, according to various embodiments, the health report 108 may include recommended reuse conditions, such as operating conditions (e.g., temperature, voltage, speed, etc., without limitation) for a secondary application for the memory device 102. In some embodiments, the recommended operating conditions may be used to suggest and/or select a secondary application.

According to various embodiments, in addition to standard health report data fields, the health report 108 may include the number of programmable data fields 110 related to reusing and/or repurposing the memory device 102. Stated another way, the health report 108 may include a number of reuse-specific data fields. For example, the data fields 110 may include one or more data fields for indicating a reuse mode (e.g., whether or not the memory device may be reused in a secondary application), one or more data fields for indicating a reuse state (e.g., whether the memory device is operating in a primary or secondary application), one or more data fields for indicating the reuse grade, one or more data fields for indicating conditions for reuse, one or more data fields for indicating one or more suggested secondary applications, one or more data fields for indicating an estimated life expectancy (e.g., based on program-erase cycles), and/or one or more data fields for indicating memory blocks fits for reuse. Further, for example, the data fields 110 may include one or more data fields indicating whether or not the memory device 102 is fit for one or more types of applications (e.g., secure applications, non-power-stringent applications, lower demand application, non-signaling-stringent applications, without limitation) and/or one or more data fields indicating whether the memory device 102 is fit for various operations (e.g., hardware encryption or storing confidential data).

In some embodiments, the health report 108, and more specifically the data fields 110, may be updated with additional data gathered (e.g., extracted) during and/or after operation of the memory device 102. For example, the additional data may include, as non-limiting examples, details such as internal temperature of the memory device 102, signal data (e.g., expected and/or observed signal conditions (e.g., voltage peaks)) of the memory device 102, program/erase counts, and/or data related to reliability of the memory device 102 (i.e., reliability-related data). For example, the health report 108 may be protected by a secure access key and may only be accessed using the secure access key.

The host 104, which may include a processor or any other type of controller, may be configured to control and/or regulate various operations of the memory system 100. The host 104 may be configured to send a number of signals to the memory device 102 to read from, write to, and/or refresh any or all memory cells within the memory device 102.

Further, the host 104 may be configured for carrying out one or more embodiments disclosed herein. For example, in some embodiments described more fully below, the host 104 may be configured to retrieve health report information from the memory device 102, compare the health report information to specification data (e.g., required specifications for possible secondary applications), and determine whether the memory device is fit for a secondary application. In other embodiments as described more fully below, the host 104 may be configured to retrieve health report information for the memory device 102, compare the health report information to specification data (e.g., required specifications for possible secondary applications), and determine one or more possible secondary applications suitable for the memory device. In yet other embodiments described more fully below, the host 104 may be configured to determine, based on health report information and/or one or more tests performed on the memory device 102, whether the memory device 102 is suitable for a primary application. Responsive to determining that the memory device 102 is not suitable for the primary application (e.g., based on one or more failures and/or violations detected during testing and/or use of the memory device 102), the host 104 may identify one or more secondary applications suitable for the memory device 102.

According to various embodiments, in response to selection of a secondary application and/or a determination that a selected secondary application is suitable for the memory device 102, a reuse mode may be enabled, and the memory device 102 may be operated in the secondary application (i.e., rather than its primary or originally intended application). For example, a reuse mode may be enabled by a series of commands (e.g., either by the host 104 or by a user). Further, for example, in response to enabling a reuse mode, a series of steps or commands may be issued (e.g., via the host 104) to reconfigure the memory device 102, erase data from the memory device 102, sanitize the memory device 102 (e.g., for future use and for protection of confidential data), release specific blocks for use, and/or lock specific blocks from being used. In some embodiments, reuse mode information, which may indicate that the memory device 102 is operating in a reuse mode and possibly one or more reuse conditions, may be stored on the memory device 102 (e.g., in the health report 108) and may be read by the host 104. Further, in some embodiments, the reuse mode information may include updated specification data for the memory device 102 (i.e., for operating in a secondary application).

Figure 2:
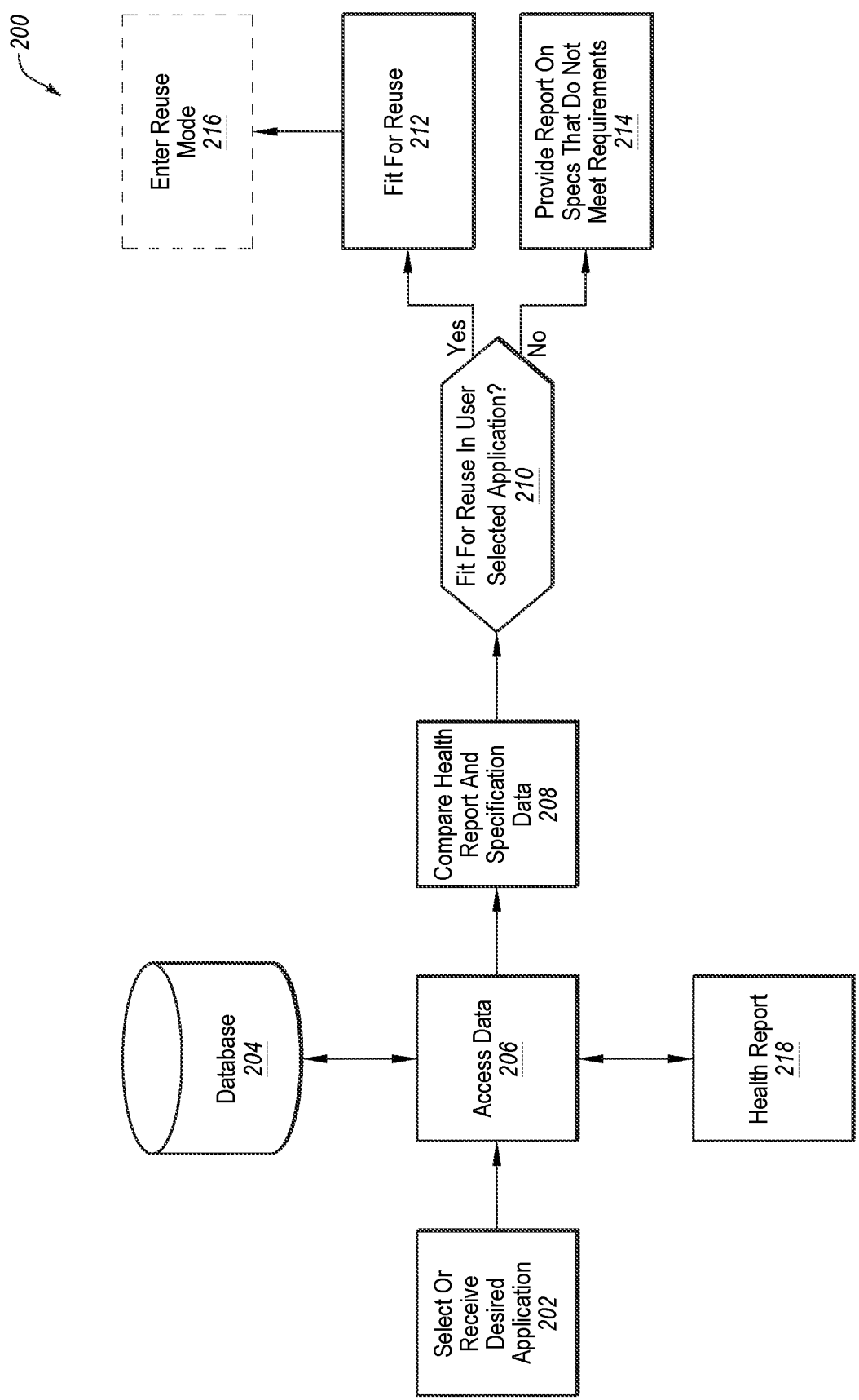
FIG. 2 is a diagram of an example flow, in accordance with various embodiments of the present disclosure.

FIG. 2 is a diagram of an example flow 200, in accordance with various embodiments of the disclosure. The flow 200 may be arranged in accordance with at least one embodiment described in the disclosure. The flow 200 may be performed, in some embodiments, by a circuit, a device, or a system, such as the memory system 100 of FIG. 1, an electronic system 500 of FIG. 5, and/or another device or system. Although illustrated as discrete blocks, various blocks may be divided into additional blocks, combined into fewer blocks, or eliminated, depending on the desired implementation.

The flow 200 may begin at block 202, wherein a secondary application for memory device reuse may be selected (e.g., by a user) and/or received by a host (e.g., the host 104 of FIG. 1). For example, a user may select a secondary application among a list of possible secondary applications for a memory device (e.g., the memory device 102 of FIG. 1). For example, the list of possible secondary applications may be provided by a memory device manufacturer. For example, the secondary application may be an industrial or commercial application, and more specifically, for example, a non-power-stringent application or a non-reliability intensive application. More specifically, for example, the secondary application may include use of the memory device (e.g., the memory device 102 of FIG. 1) within, for example, a mobile phone, a smartphone, a tablet, an e-reader, any device compatible with the Internet of things (IoT), a camera, a computer, or a video game console.

At block 206, reuse data may be accessed. More specifically, a health report 218 for the memory device may be accessed and/or generated. For example, the health report 218 (e.g., the health report 108 of FIG. 1) may include a comprehensive health report for the memory device (e.g., the memory device 102 of FIG. 1). For example, as noted above, the health report 218 may include one or more data fields (e.g., the data fields 110 of FIG. 1) indicative of a reuse grade, which may indicate a health status of the memory device and/or which secondary applications (e.g., non-power-stringent application, lower demand application, non-signaling-stringent applications) may or may not be suitable for the memory device. Moreover, according to various embodiments, the health report 218 may include one or more data fields indicative of recommended operating conditions (e.g., temperature, speed, voltage, without limitation) for a secondary application for the memory device. Further, the health report 218 may include one or more data fields indicative of memory device tests results (e.g., areas of failure and/or application specific violations). In some embodiments, one or more secondary applications may be identified, suggested, and/or selected based at least partially on one or more of the recommended operating conditions, or other data, included in the health report.

Further, at block 206, a database (e.g., a manufacturer managed database) 204, which may include information relating to specification requirements for a number of possible secondary applications, may be accessed. For example the database 204 may include specification requirements for each of a number of possible secondary applications, including the secondary application selected at block 202. The database 204 may also include information relating to known health grades or assessment values for memory devices, and possibly suitable application for memory devices having known health grades or assessment values. More specifically, for example, the database 204 may include a lookup table wherein possible secondary applications for reuse are mapped to specifications and known health grades or assessment values for memory devices. Further, for example, the database 204 may include minimum or desired specification data mapped to particular secondary applications. For example, a host (e.g., the host 104 of FIG. 1) or another device of a memory system may include the database 204.

In some embodiments, at block 206, the memory device may be accessed (e.g., by a host) to obtain health report information for the memory device. In other embodiments, at block 206, the memory device may be accessed for additional information (e.g., a number of reads and/or writes performed, internal temperature, expected and/or observed signal conditions (e.g., voltage peaks), reliability related data, without limitation) such that the health report (e.g., a comprehensive health report) may be updated and/or generated (e.g., by a host, such as host 104 of FIG. 1).

At block 208, specification data for the memory device (i.e., based on the health report of the memory device) may be compared to specification data for the selected secondary application. For example, if the selected secondary application is a consumer electronic device (e.g., a commercial application), the specification data for the memory device may be compared to known specification data for a consumer electronic device (e.g., for a commercial application). As another example, if the selected secondary application is an eco-smart whiteboard (e.g., for a school), the specification data for the memory device may be compared to known specification data for an eco-smart whiteboard.

At decision block 210, it is determined, based on the comparison at block 208, whether the secondary application selected at block 202 is appropriate based on the health of the memory device. If the health of the memory device (i.e., as indicated via the health report) is sufficient such that the specifications for the memory device meet the minimum specifications for the selected secondary application, it may be determined that the memory device is suitable for the selected secondary application. For example, the host 104 (see FIG. 1) or another device may determine that the memory device 102 may be reused in the selected secondary application, as shown in block 212. Further, in some embodiments, a user (e.g., a customer or other individual) may be informed that the memory device may be reused in the selected secondary application.

If, based on the comparison at block 208, it is determined (e.g., via the host 104 of FIG. 1 or another device) that that the memory device does not meet the minimum requirements for the selected secondary application, a report, which may be, for example, generated and provided to a user, may indicate the lack of fitness, as shown in block 214. In some embodiments, the generated report may also provide specifics on which specifications are lacking in the memory device and/or may provide additional suggestions for other possible secondary applications, if any. In some embodiments, the generated report may include information regarding the location and/or type of failures (e.g., which components of the memory device failed and/or what type of failures were detected), as described more fully below with reference to FIG. 4.

At block 216, upon determining that the memory device is fit for reuse in the selected secondary application, a reuse mode may be enabled. For example, a user may cause the memory device to enable and enter the reuse mode. In some embodiments, the user may be prompted to select to enable the reuse mode or decline to enable the reuse mode. In other embodiments, the reuse mode may be entered or enabled automatically upon determining that the memory device satisfies the specification requirements for the selected secondary application. In some examples, once the reuse mode is enabled, a Boolean value representing a reuse mode status (e.g., in the health report) may be toggled. Further, in some examples, once the reuse mode is enabled, the memory device may be reconfigured to operate at a reduced capacity, which may include, as a non-limiting example, limiting the voltages used in the memory device.

Modifications, additions, or omissions may be made to the flow 200 without departing from the scope of the disclosure. For example, the operations of the flow 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, the flow 200 may include one or more acts wherein the memory device is reconfigured responsive to a reuse mode being enabled.

Figure 3:
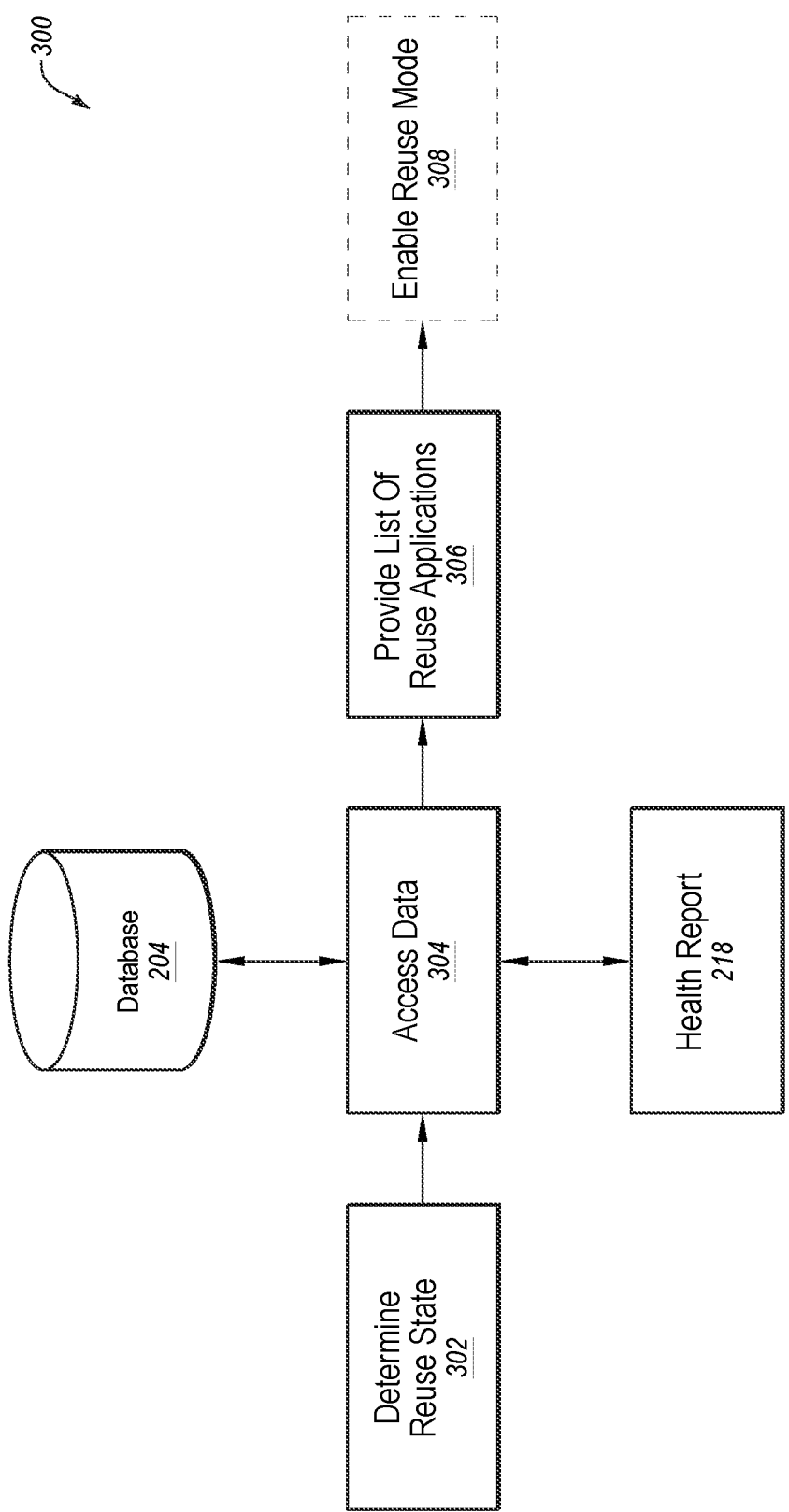
FIG. 3 is a diagram of another example flow, in accordance with various embodiments of the present disclosure.

FIG. 3 is a diagram of another example flow 300, in accordance with various embodiments of the disclosure. The flow 300 may be arranged in accordance with at least one embodiment described in the disclosure. The flow 300 may be performed, in some embodiments, by a circuit, a device, or a system, such as the memory system 100 of FIG. 1, the electronic system 500 of FIG. 5, and/or another device or system. Although illustrated as discrete blocks, various blocks may be divided into additional blocks, combined into fewer blocks, or eliminated, depending on the desired implementation.

The flow 300 may begin at block 302, wherein a reuse state for a memory device may be determined. More specifically, for example, in response to monitoring the health of the memory device (e.g., the memory device 102 of FIG. 1) and/or an event (e.g., the memory device reaching its life expectancy and/or a user inquiry), or at any other time, it may be determined (e.g., via a host, such as host 104 of FIG. 1) whether or not the memory device is configurable to be reused in a secondary application and/or whether the memory device is operating in a primary or secondary application (e.g., whether or not the memory device is already operating in a reuse state). For example, data (e.g., one or more bits) may be read (e.g., via a host, such as host 104 of FIG. 1) to determine a reuse state of the memory device.

At block 304, reuse data may be accessed. More specifically, the health report 218 for the memory device may be generated and/or accessed. For example, the health report 218, which, as noted above, may include various data related to reuse of a memory device, may be accessed via a host (e.g., host 104 of FIG. 1).

Further, at block 304, the database 204 may be accessed. As noted above, the database (e.g., a manufacturer managed database) 204 may contain information relating to specification requirements for a number of possible secondary applications and/or various memory device health scenarios. For example, the database 204 may contain a list of possible secondary applications for reuse based on minimum health standards for memory devices. Further, for example, the database 204 may include minimum specifications for each possible secondary application which can be mapped to the health standards for the memory device.

At block 306, a list of possible secondary applications for the memory device may be provided based on the health report of the memory device. For example, the list of possible secondary applications may be provided (e.g., to a user) based on a mapping of the health of the memory device to requirements for various secondary applications. For example, a host (e.g., the host 104 of FIG. 1) or another device may generate and provide the list of possible secondary applications for the memory device.

Optionally, at block 308, a reuse mode may be enabled based on the health report and the potential secondary applications for which the memory device qualifies. For example, the reuse mode may be automatically enabled (e.g., via the memory device and/or a host) based on the health report and a potential secondary application. In other embodiments, a user may be prompted to select a secondary application among the list of possible secondary applications. In these embodiments, once the user selects the secondary application, the reuse mode may be enabled and reuse mode information may be stored on the memory device (e.g., within the health report). For example, the reuse mode information, which may indicate that the memory device is operating in the reuse mode, may include a Boolean flag that is set at the memory device.

Modifications, additions, or omissions may be made to the flow 300 without departing from the scope of the disclosure. For example, the operations of the flow 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, the flow 300 may include one or more acts wherein the memory device is reconfigured responsive to the reuse mode being enabled.

Figure 4:
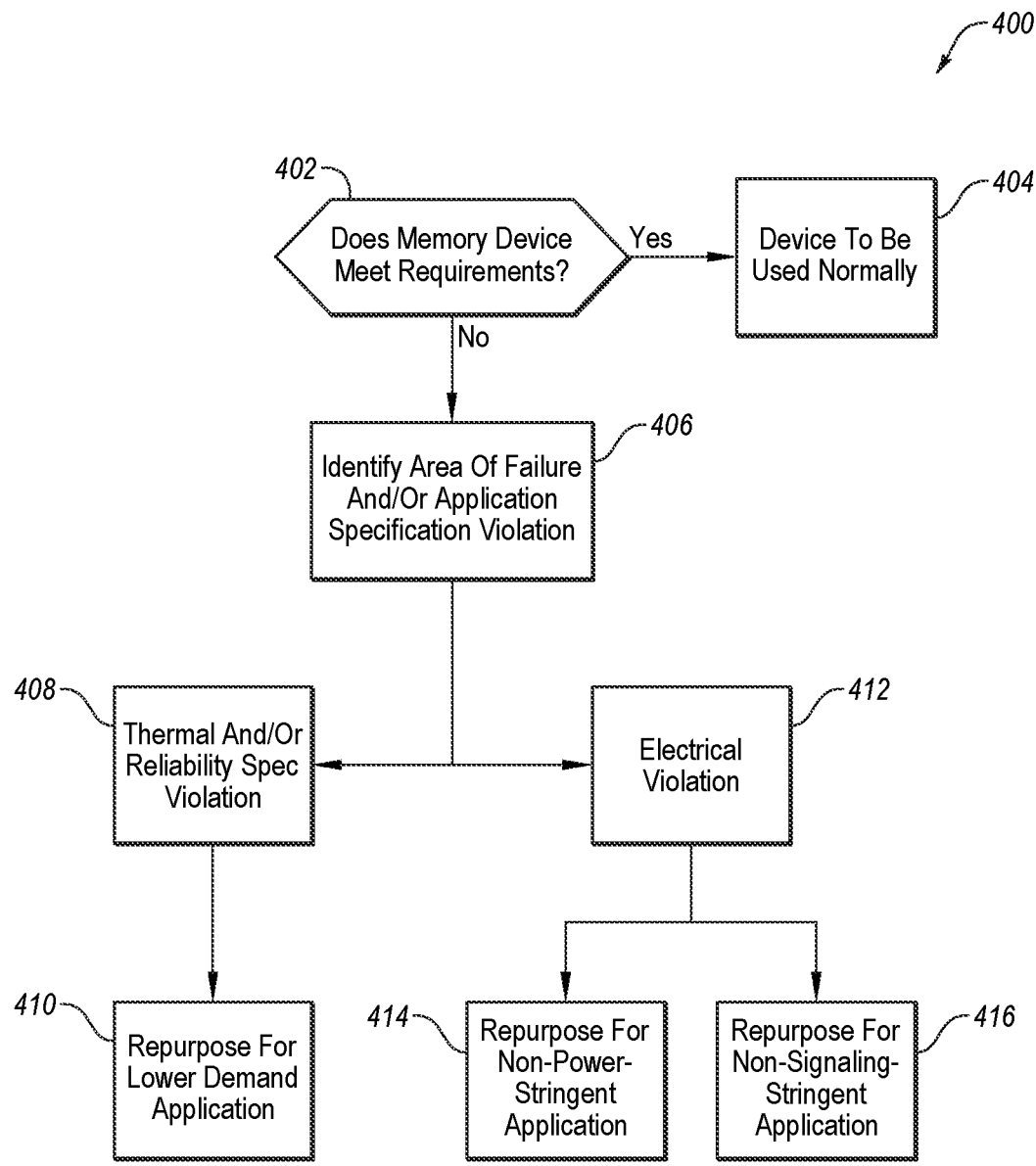
FIG. 4 is a flowchart of an example method, in accordance with various embodiments of the present disclosure.

FIG. 4 is a flowchart of an example method 400, in accordance with various embodiments of the disclosure. The method 400 may be arranged in accordance with at least one embodiment described in the disclosure. The method 400 may be performed, in some embodiments, by a circuit, a device, or a system, such as the memory system 100 of FIG. 1, the electronic system 500 of FIG. 5, and/or another device or system. Although illustrated as discrete blocks, various blocks may be divided into additional blocks, combined into fewer blocks, or eliminated, depending on the desired implementation.

At block 402, a memory device may be tested to determine if the memory device meets the specification requirements for its intended application. For example, a health report for the memory device, such as health report 108 of FIG. 1, may be generated and/or analyzed to determine whether a state or condition (e.g., a health grade for the memory device) of the memory device is sufficient for its intended application. Additionally or alternatively, one or more tests (e.g., performed at various points during or after a manufacturing process) may be performed to determine whether the memory device is sufficient for its intended application. If the memory devices meets the minimum requirements for its intended application, the memory device may be used in normal operation (i.e., in its primary or normal application), as shown at block 404. However, if the memory device does not satisfy the application specification requirements, method 400 may proceed to block 406.

At block 406, one or more areas of failure for the memory device is identified. Additionally or alternatively, a violation of the application specification is also identified. For example, one or more components (e.g., specific blocks, entire die, etc.) of the memory device that failed (e.g., one or more tests) may be identified. As another example, certain specification requirements (e.g., thermal requirements, reliability requirements, and power requirements) that were not successfully met (e.g., during one or more tests) may be identified.

At block 408, it may be determined that the specification violation relates to a thermal test and/or a reliability test. More specifically, it may be determined that package or die level thermal and/or reliability violations have occurred. For example, it may be determined that the memory device failed to perform according to minimum specifications within an operating temperature range. As another example, it may be determined that the memory device failed to perform satisfactorily after or during a number of cycles at an elevated temperature. As another example, it may be determined that the memory device failed to function properly at a storage temperature. As yet another example, it may be determined that the memory device failed one or more electrostatic discharge (ESD) tests.

At block 410, in response to determining that the specification violation relates to a thermal test and/or a reliability test, the memory device may be repurposed for another application (e.g., a lower demand application). For example, the memory device may be repurposed with an updated specification with, for example, updated guidelines for operation including, without limitation, junction temperature, thermal resistance, and/or power dissipation. As a non-limiting example, automotive applications may be the most demanding for heat and thermal durability and resilience. Further, for example, industrial applications, which may be the next most demanding, may need memory devices with a relatively high tolerance for heat variability. Commercial applications may be, without limitation, the lowest demanding applications relating to heat and thermal operation specifications.

At block 412, it may be determined that the violation identified in block 406 is an electrical violation. Further, it may be determined that the electrical violation includes one or more power violations. For example, a power violation may occur responsive to the memory device failing to deliver power properly where minimum pad requirements are not met. In one example, if power failure is a primary cause for the memory device failing to satisfy the application specification requirements, the memory device may be repurposed for a less power-demanding application, at block 414.

Further, it may be determined that the electrical violation (determined at block 412) includes a signaling violation. For example, a signaling violation may include a failure to meet eye mask requirements (e.g., at a receiver). In some embodiments, in response to a signaling violation, at block 416, the memory device may be repurposed for non-signaling-stringent applications. Further, for example, in response to a signaling violation, a channel density of the memory device may be reduced (e.g., by deactivating (e.g., via a firmware) failing bytes and their corresponding dies or loads). As another example, in response to a signaling violation, one or more pins (e.g., data pins, command pins, address pins, or other pins) of the memory device may be disabled and identified in an updated data sheet as unconnected or not connected pins. As yet another example, in response to a signaling violation, the memory device may be operated at a lower data rate (e.g., such that the data rate is less than a lower end speed of an associated data interface).

Modifications, additions, or omissions may be made to the method 400 without departing from the scope of the disclosure. For example, the operations of the method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

A system is also disclosed. According to various embodiments, the system may include a memory device including a number of memory banks, each memory bank having an array of memory cells. Each memory cell may include an access transistor and a storage element operably coupled with the access transistor.

Figure 5:
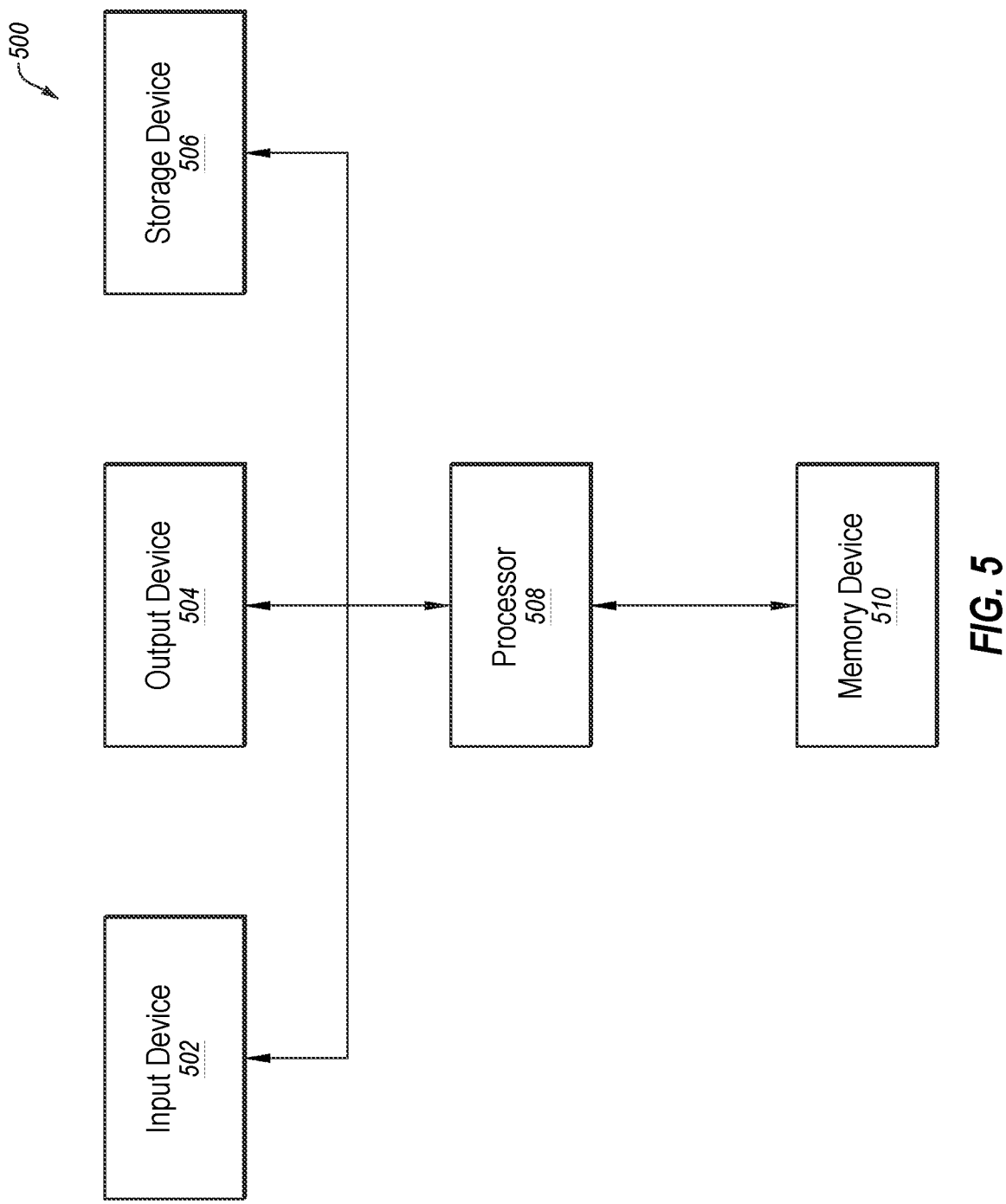
FIG. 5 is a simplified block diagram of an example electronic system, in accordance with various embodiments of the present disclosure.

FIG. 5 is a simplified block diagram of an electronic system 500 implemented according to one or more embodiments described herein. The electronic system 500 includes at least one input device 502, which may include, for example, a keyboard, a mouse, or a touch screen. The electronic system 500 further includes at least one output device 504, such as a monitor, a touch screen, or a speaker. The input device 502 and the output device 504 are not necessarily separable from one another. The electronic system 500 further includes a storage device 506. The input device 502, the output device 504, and the storage device 506 may be coupled to a processor 508. The electronic system 500 further includes a memory device 510 coupled to the processor 508. The memory device 510 may include the memory system 100 of FIG. 1. The electronic system 500 may include, for example, a computing, processing, industrial, or consumer product. For example, without limitation, the electronic system 500 may include a personal computer or computer hardware component, a server or other networking hardware component, a database engine, an intrusion prevention system, a handheld device, a tablet computer, an electronic notebook, a camera, a phone, a music player, a wireless device, a display, a chip set, a game, a vehicle, or other known systems.

For example, in one example scenario, the electronic system 500, and more specifically the memory device 510, may be configured for use in a primary application (e.g., an automotive application), and subsequently, in response to either a selection (e.g., by a user or a manufacturer) or an event (e.g., at the end of the life of the memory device 510), the electronic system 500, and more specifically the memory device 510, may be configured for use in a secondary application (e.g., an industrial or commercial application).

As will be appreciated, various embodiments disclosed herein provide for reusing and repurposing memory with limited changes to software or firmware. Further, as will also be appreciated, various embodiments disclosed herein may reduce waste in semiconductor manufacturing facilities and/or reduce costs associated with semiconductor manufacturing.

Various embodiments of the disclosure may include a method including receiving an indication of a selected secondary application for a memory device. The method may also include accessing health information for the memory device. Further, the method may include determining whether the memory device is fit for the selected reuse application responsive to the health information.

One or more embodiments of the disclosure may include a method including determining that a microelectronic device is to be reused for a secondary application. The method may also include determining health information for the microelectronic device. Further, the method may include determining one or more possible reuse applications for the microelectronic device responsive to the health information.

Some embodiments of the disclosure include a memory device including a number of memory arrays. The memory device may further include a health report stored on at least one memory array of the number of memory arrays, wherein the health report includes at least one data field indicative of a reuse grade for the memory device.

Additional embodiments of the disclosure include a system including a microelectronic device and a host coupled to the microelectronic device. The host may be configured to determine health information for the microelectronic device. The host may also be configured to enable a reuse mode for the microelectronic device responsive to the health information.

One or more other embodiments of the disclosure include a system including at least one input device, at least one output device, at least one processor device operably coupled to the input device and the output device, and a memory device operably coupled to the at least one processor device. The memory device may include a health report. The health report may include at least one data field indicative of a reuse mode for the memory device. The health report may further include at least one data field indicative of a reuse grade for the memory device.

According to another embodiment of the disclosure, a method may include performing one or more tests on a microelectronic device, and identifying, at least partially based on the one or more tests, at least one of a failure or a violation associated with the microelectronic device. The method may further include repurposing the microelectronic application in a repurpose application at least partially responsive to the at least one of the failure or the violation.

In yet another embodiment of the disclosure, a method may include accessing health information for a microelectronic device. The method may also include determining, at least partially responsive to the health information, that the microelectronic device is fit for reuse. Furthermore, the method may include determining one or more possible reuse applications for the microelectronic device at least partially responsive to the health information.

In accordance with common practice, the various features illustrated in the drawings may not be drawn to scale. The illustrations presented in the disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC).

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method, comprising:
   receiving an indication of a selected secondary application for a memory device;
   accessing health information for the memory device;
   determining whether the memory device is fit for the selected secondary application responsive to the health information;
   enabling a reuse mode on the memory device responsive to determining that the memory device is fit for the selected secondary application, wherein enabling the reuse mode comprises:
      providing a prompt to a user indicating that the memory device is fit for the selected secondary application; and
      receiving an input command from the user to enable the reuse mode; and
   reconfiguring the memory device responsive to enabling the reuse mode.

2. The method of claim 1, wherein determining whether the memory device is fit for the selected secondary application comprises comparing specification data for the memory device to secondary application specification requirement data.

3. The method of claim 1, wherein receiving the indication of the selected secondary application comprises receiving the indication of the selected secondary application among a predetermined number of potential secondary applications.

4. The method of claim 1, further comprising generating a report responsive to determining that the memory device is unfit for the selected secondary application.

5. The method of claim 1, wherein reconfiguring the memory device comprises:
   erasing data from the memory device; and
   storing reuse mode information on the memory device, the reuse mode information indicating that the memory device is operating in the reuse mode.

6. The method of claim 1, wherein accessing health information comprises accessing a reuse grade for the memory device, one or more reuse conditions for the memory device, or any combination thereof.

7. A method, comprising:
   determining that a microelectronic device is to be reused in a reuse application;
   determining health information for the microelectronic device;
   determining one or more possible reuse applications for the microelectronic device responsive to the health information; and
   enabling a reuse mode for the microelectronic device, wherein enabling the reuse mode comprises:
      prompting a user to select a reuse application among the determined one or more possible reuse applications;
      receiving an input from the user to enable the reuse mode; and
      storing reuse mode information on the microelectronic device, the reuse mode information indicating that the microelectronic device is operating in the reuse mode.

8. The method of claim 7, wherein determining the one or more possible reuse applications for the microelectronic device comprises determining the one or more possible reuse applications for the microelectronic device responsive to a comparison of the health information to predetermined specifications of a number of possible reuse applications.

9. A memory device, comprising:
   a number of memory arrays; and
   a health report stored on at least one memory array of the number of memory arrays, the health report including at least one data field indicative of a reuse grade for the memory device.

10. The memory device of claim 9, wherein each of the number of memory arrays comprises a NAND flash memory array.

11. The memory device of claim 9, the health report further including a number of additional data fields indicating at least one of one or more operating conditions for reuse of the memory device, one or more memory blocks of the memory device fit for reuse, or an estimated life expectancy of the memory device.

12. The memory device of claim 9, the health report further including at least one additional data field indicating whether or not the memory device is operating in a reuse mode.

13. A system, comprising:
   a microelectronic device; and
   a host coupled to the microelectronic device and configured to:
      receive an indication of a selected reuse application for the microelectronic device;
      access health information for the microelectronic device; and
      enable a reuse mode for the microelectronic device to operate in the selected reuse application responsive to the health information.

14. The system of claim 13, wherein the host is further configured to:
   access data from a health report stored on the microelectronic device to access the health information; and
   compare the health information to specification data for the selected reuse application to determine if the microelectronic device is suitable for the selected reuse application.

15. The system of claim 13, wherein the host is further configured to:
   determine at least one of one or more failures or one or more violations associated with the microelectronic device based on the health information; and
   enable the reuse mode based on a comparison of the at least one of one or more failures or one or more violations associated with the microelectronic device and one or more requirements for the selected reuse application.

16. A system, comprising:
   at least one input device;
   at least one output device;
   at least one processor device operably coupled to the input device and the output device; and
   a memory device operably coupled to the at least one processor device and including a health report, the health report including:
      at least one data field indicative of a reuse mode for the memory device; and
      at least one data field indicative of a reuse grade for the memory device.

17. The system of claim 16, wherein the health report further includes:
   at least one data field indicative of at least one of one or more operating conditions for reuse of the memory device; and
   at least one data field indicative of one or more memory blocks of the memory device fit for reuse.

18. A method, comprising:
   performing one or more tests on a microelectronic device;
   identifying, at least partially based on the one or more tests, at least one of a failure or a violation associated with the microelectronic device; and
   repurposing the microelectronic device in a repurpose application at least partially responsive to the at least one of the failure or the violation.

19. The method of claim 18, wherein the identifying the at least one of the failure or the violation comprises identifying at least one of an electrical violation, a thermal violation, or a reliability violation.

20. The method of claim 18, wherein the repurposing the microelectronic device in the repurpose application comprises repurposing the microelectronic application in at least one of a commercial application or an industrial application.

21. The method of claim 18, wherein the repurpose application is different than an intended primary application of the microelectronic device.

22. A method, comprising:
   accessing health information for a microelectronic device;
   determining, at least partially responsive to the health information, that the microelectronic device is fit for reuse;
   determining one or more possible reuse applications for the microelectronic device at least partially responsive to the health information;
   enabling a reuse mode for the microelectronic device; and
   reconfiguring the microelectronic device responsive to enabling the reuse mode.

23. The method of claim 22, wherein determining, at least partially responsive to the health information, that the microelectronic device is fit for reuse comprises determining, at least partially responsive to the health information, that the microelectronic device meets minimum specification requirements for the one or more possible reuse applications.

24. The method of claim 22, further comprising reusing the microelectronic device in a reuse application of the one or more possible reuse applications, the reuse application comprising at least one of a commercial application or an industrial application.

\* \* \* \* \*